US00RE35057E

United States Patent [19]

Freeman et al.

[11] E Patent Number: Re. 35,057

[45] Reissued Date of Patent: Oct. 10, 1995

[54] SPEECH CODING USING SPARSE VECTOR CODEBOOK AND CYCLIC SHIFT TECHNIQUES

[75] Inventors: Daniel K. Freeman; Ivan Boyd, both of Ipswich, England

[73] Assignee: British Telecommunications public limited company, London, England

[21] Appl. No.: 12,947

[22] Filed: Feb. 3, 1993

Related U.S. Patent Documents

Reissue of:

[64] Patent No.: 4,991,214
Issued: Feb. 5, 1991
Appl. No.: 358,350
Filed: Aug. 26, 1988

[30] Foreign Application Priority Data

Aug. 28, 1987 [GB] United Kingdom ..... 8720389
Sep. 15, 1987 [GB] United Kingdom ..... 8721667

[51] Int. Cl.[6] ..... G10L 9/14

[52] U.S. Cl. ..... 395/2.32; 395/2.28

[58] Field of Search ..... 395/2, 2.31, 2.32, 395/2.3, 2.28; 381/29–50

[56] References Cited

U.S. PATENT DOCUMENTS

| | | | |
|---|---|---|---|
| Re. 32,580 | 1/1988 | Atal et al. | 395/2.28 |
| 4,038,495 | 7/1977 | White | 381/40 |
| 4,776,015 | 10/1988 | Takeda et al. | 395/2.28 |
| 4,809,330 | 2/1989 | Tanaka et al. | 395/2.25 |
| 4,821,324 | 4/1989 | Ozawa et al. | 395/2.25 |
| 4,847,905 | 7/1989 | Lefevre et al. | 395/2.31 |
| 4,864,621 | 9/1989 | Boyd | 381/38 |
| 4,932,061 | 6/1990 | Kroon et al. | 381/30 |

FOREIGN PATENT DOCUMENTS 0195487 9/1986 European Pat. Off. .

OTHER PUBLICATIONS

Kroon et al., "Quantization Procedures for the Excitation in CELP Coders," IEEE Int'l Conf. on Acoustics, Speech & Signal Processing, Apr. 6–9, 1987, pp. 1649–1652.

Juang, "Design and Performance of Trellis Vector Quantizers for Speech Signals," IEEE Trans. on ASSP, vol. 36, No. 9, Sep. 1988, pp. 1423–1431.

L. A. Hernandez-Gomez et al., "On the Behavior of Reduced Complexity Code-Excited Linear Prediction, (CELP)," ICASSP 86 (IEEE IECEJ-ASJ International Conf. on Acoustics, Speech and Signal Processing, 7–11 Apr. 1986, Tokyo, JP), vol. 1, IEEE (New York, US), pp. 469–472.

D. Lin, "Speech Coding Using Efficient Pseudo-Stochastic Block Codes," ICASSP 87 (International Conference on Acoustics, Speech and Signal Processing, 4–6 Apr. 1987, Dallas, Tex., U.S.), vol. 3, IEEE (New York, U.S.), pp. 1354–1357.

*Primary Examiner*—David D. Knepper
*Attorney, Agent, or Firm*—Nixon & Vanderhye

[57] ABSTRACT

Speech is analyzed to derive the parameters of a synthesis filter and the parameters of a suitable excitation which is selected from a codebook of excitation frames. The selection of the codebook entry is facilitated by determining a single-pulse excitation (e.g., using conventional multipulse excitation techniques), and using the position of this pulse to narrow the codebook search.

10 Claims, 2 Drawing Sheets

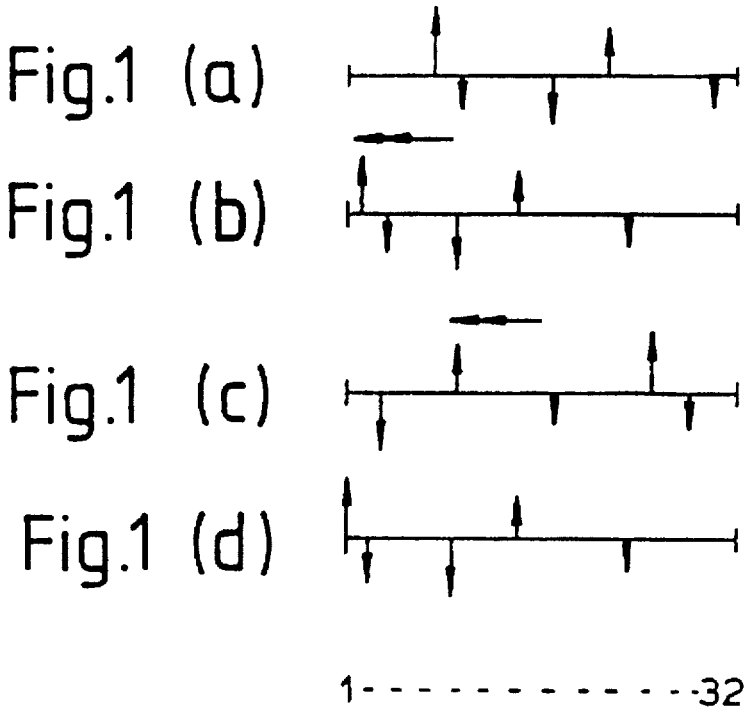
Fig.3
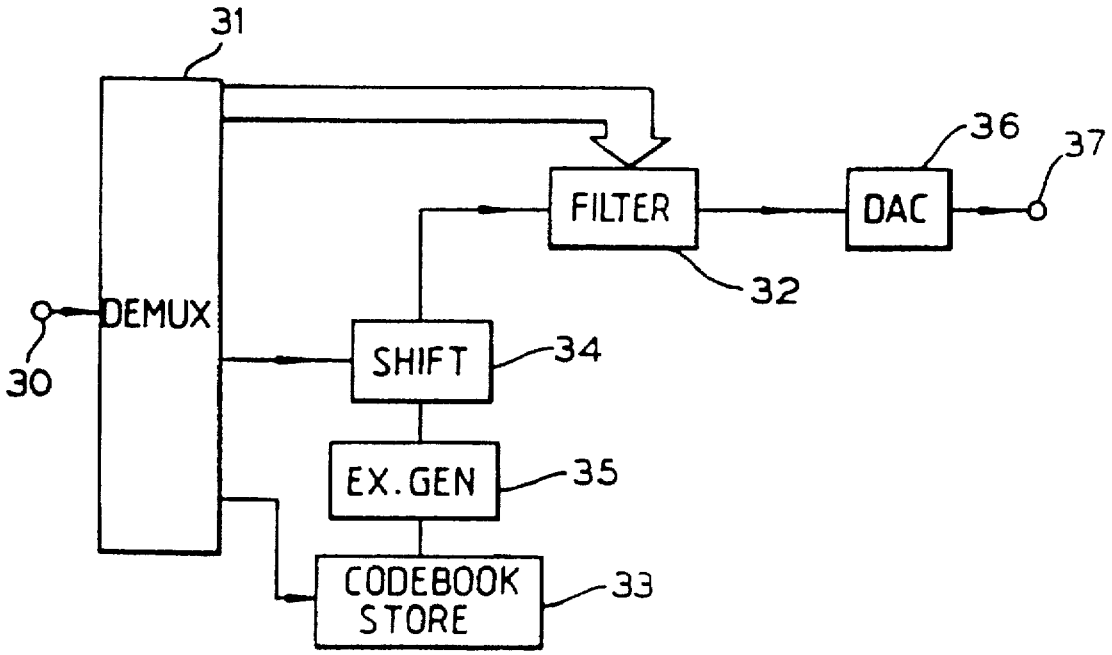

SPEECH CODING USING SPARSE VECTOR CODEBOOK AND CYCLIC SHIFT TECHNIQUES

Matter enclosed in heavy brackets [ ] appears in the original patent but forms no part of this reissue specification; matter printed in italics indicates the additions made by reissue.

BACKGROUND AND SUMMARY OF THE INVENTION

A common technique for speech coding is the so-called LPC coding in which at a coder, an input speech signal is divided into time intervals and each interval is analysed to determine the parameters of a synthesis filter whose response is representative of the frequency spectrum of the signal during that interval. The parameters are transmitted to a decoder where theiy periodically update the parameters of a synthesis filter which, when fed with a suitable excitation signal, produces a synthetic speech output which approximates the original input.

Clearly the coder has also to transmit to the decoder information as to the nature of the excitation which is to be employed. A number of options have been proposed for achieving this, falling into two main categories, viz.

(i) Residual excited linear predictive coding (RELP) where the input signal is passed through a filter which is the inverse of the synthesis filter to produce a residual signal which can be quantised and sent (possibly after filtering) to be used as the excitation, or may be analysed, e.g. to obtain voicing and pithc parameters for transmission to an excitation generator in the decoder.

(ii) Analysis by synthesis methods in which an excitation is derived such that, when passed through the synthesis filter, the difference between the output obtained and the input speech is minimised. In this category there are two distinct approaches: One is multipulse excitation (MP-LPC) in which a time frame corresponding to a number of speech samples contains a, somewhat smaller, limited number of excitation pulses whose amplitudes and positions are coded. The other approach is stochastic coding or coded excited linear prediction (CELP). The coder and decoder each have a stored list of standard frames of excitations. For each frame of speech, that one of the codebook entries which, when passed through the synthesis filter, produces synthetic speech closet to the actual speech is identified and a codeword assigned to it is sent to the decoder which can then retrieve the same entry from its stored list. Such codebooks may compiled using random sequence generation; however another variant is the so-called 'sparse vector ' codebook in which a frame contains only a small number of pulses (e.g. 4 or 5 pulses out of 32 possible positions with a frame). A CELP coder may typically have a 1024-entry codebook.

The present invention is defined in the appended claims.

Some embodiments of the invention will now be described, by way of example, with reference to the accompanying drawings, in which:

BRIEF DESCRIPTION OF THE DRAWING

FIGS. 1(a–c) illustrate three typical members of a set of cyclically related excitations to be used in the invention;

FIG. 1(d) shows a single excitation representing the excitations shown in FIGS. 1(a–c);

FIG. 3 is a block diagram of a suitable decoder.

DESCRIPTION OF THE PREFERRED EMBODIMENTS

Figure 2:
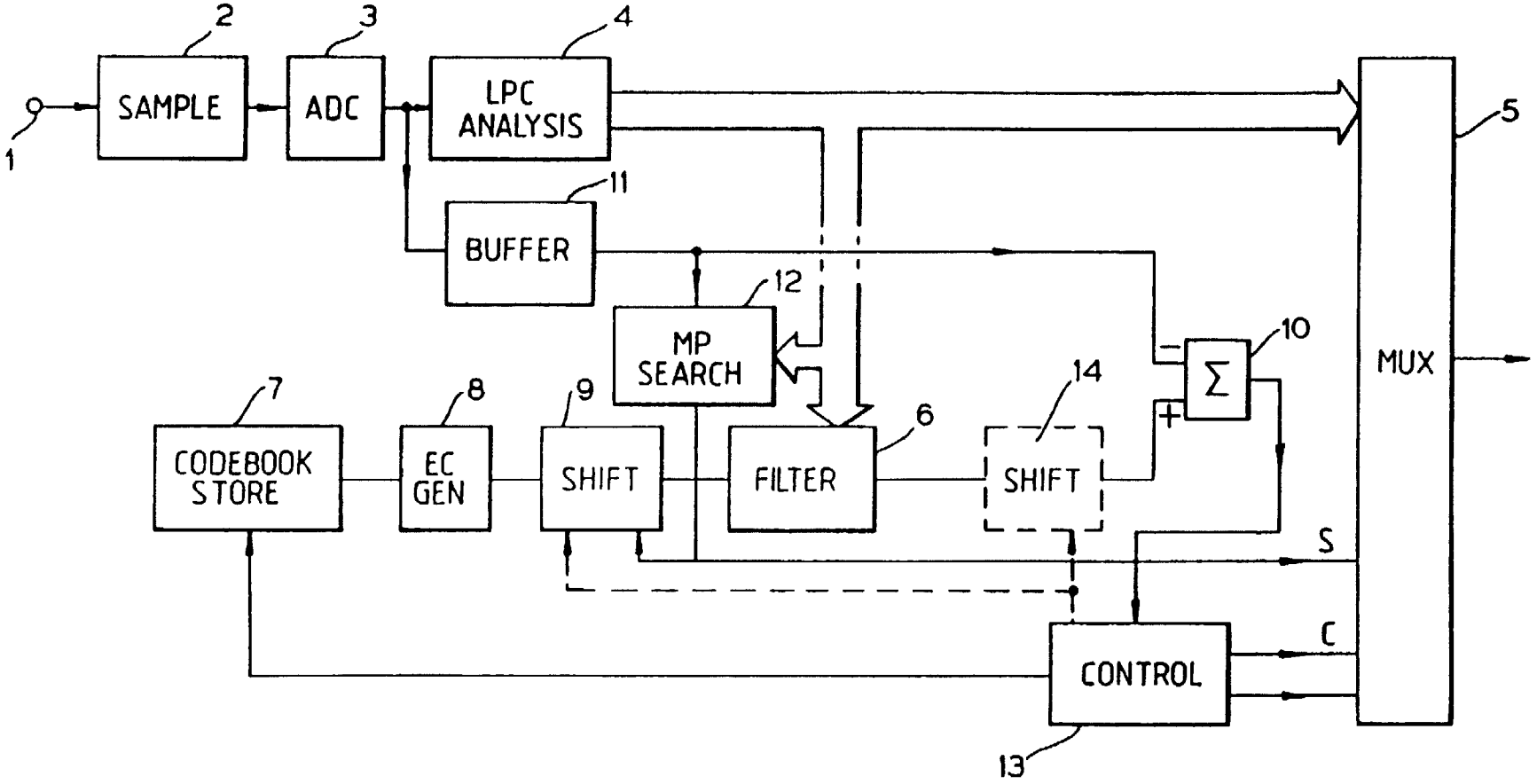
FIG. 2 is a block diagram of one form of speech coder according to the invention.

It will be appreciated from the introduction that multipulse coders and sparse vector CELP coders have in common the features that the exciation employed is in both cases a frame containing a number of pulses significantly smaller than the number of allowable positions within the frame.

The coder now to be described is similar to CELP in that it employs a sparse vector codebook which is, however much smaller than that conventionally used; perhaps 32 or 64 entries. Each entry represents one excitation from which can be derived other members of a set of excitations which differ from the one excitation—and from each other—only by a cyclic shift. Three such members of the set are shown in FIGS. 1a, 1b and 1c for a 32 position frame with five pulses, where it is seen that 1b can be formed from 1a by cyclically shifting the entry to the left, and likewise 1c from 1a. The amount of shift is indicated in the figure by a double-headed arrow. Cyclic shifting means that pulses shifted out of the left-hand end wrap around and reenter from the right. The entry representing the set is stored with the largest pulse in position 1, i.e. as shown in FIG. 1d. The magnitude of the largest pulse need not be stored if the others are normalised by it.

If the number of codebook entries is 32, then the excitation selected can be represented by a 5-bit codeword identifying the entry and a further 5 bits giving the number of shifts from the stored position (if all 32 possible shifts are allowed).

FIG. 2 is a block diagram of a speech coder. Speech signals received at an input 1 are converted into samples by a sampler 2 and then into digital form in an analogue-to-digital converter 3. An analysis unit 4 computes, for each successive group of samples, the coefficients of a synthesis filter having a response corresponding to the spectral content of the speech. Derivation of LPC coefficients is well known and will not be described further here. The coefficients are supplied to an output multiplexer 5, andd also to a local synthesis filter 6. The filter update rate may typically be once every 20 ms.

The coder has also a codebook store 7 containing the thirty-two codebook entries discussed above. The manner in which the entries are stored is not material to the present invention but it is assumed that each entry (for a five pulse excitation in a 32 sample period frame) contains the positions within the frame and the amplitudes of the four pulses after the first. This information, when read from the store is supplied to an excitation generator 8 which produces an actual excitation frame—i.e., 32 values (of which 27 are zero, of course). Its output is supplied via a controllable shifting unit 9 to the input of the synthesis filter 6. The filter output is compared by a subtractor 10 with the input speech samples supplied via a buffer 11 (so that a number of comparisons can be made between one 32-sample speech frame and different filtered excitations).

In order to ascertain the appropriate shift value, certain techniques are borrowed from multipulse coding. In multipulse coding, a ccommon method of deriving the pulse positions and amplitudes is an iterative one, in which one pulse is calculated which minimises the error between the synthetic and actual speech. A further pulse is then found which, in combination with the first, minimises the error and so on. Analysis of the statistics of MP-LPC pulses show that the first pulse to be derived usually has the largest amplitude.

This embodiment of the invention makes use of this by carrying out a multipulse search to find the location of this first pulse only. Any of the known methods for this may be employed, for example that described in B. S. Atal and J. R. Remde, 'A New Model of LPC Excitation for producing Natural Sounding Speech at Low Bit Rates,' Proc. IEEE Int. Conf. ASSP, Paris, 1982, p. 614.

A search unit 12 is shown in FIG. 2 for this purpose its output feeds the shifter 9 to determine the rotational shift applied to the excitation generated by the generator 8. Effectively this selects, from 1024 excitations, allowed by the codebook, a particular class of excitations, namely those with the largest pulse occupying the particular position determined by the search unit 13.

The output of the subtractor 10 feeds a control unit 13 which also supplies addresses to the store 7 and sift values to the shifting unit 9. The purpose of the control unit is to ascertain which of the 32 possible excitations represented by the selected class gives the smallest subtractor output (usually the mean square value of the differences, over a frame). The finally determined entry and shift are output in the form of a codeword C and shift value S to the output multiplexer 5.

The entry determination by the control unit for a given frame of speech available at the output of the buffer 11 is as follows:

(i) apply successive code (codebook addresses ) to the store 7

(ii) apply to each codebook entry a shift such as to move the largest pulse to the position indicated by the 'multipulse' search.

(iii) monitor the output of the subtractor 10 for all 32 entries to ascertain which gives rise to the lowest mean square difference.

(iv) output the codeword and shift value to the multiplexer.

Compared with a conventional CELP coder using a 1024 entry codebook, there is a small reduction in the signal-to-noise ratio obtained due to the constraints placed on the excitation (i.e. that they fall into 32 mutually shiftable classes). However there is a reduction in the codebook size and hence the storage requirement for the store 7. Moreover, the amount of computation to be carried out by the control unit 13 is significantly reduced since only 32 tests rather than 1024 need to be carried out.

To allow for the sub-optimal selection, inherent in the 'multipulse search', the above process may also include excitations which are shifted a few positions before and after the position found by the search.

This could be achieved by the control unit adding/subtracting appropriate values from the shift value suplied to the shifting unit 9, as indicated by the dotted line connection. However, since the filtered output of a time shifted version of a given excitation is a time shifted version of the filter's response to the given excitation, these shifts could instead be performed by a second shifter 14 placed after the synthesis filter 6. Once wrap-around occurs, however, the result is no longer correct: this problem may be accommodated by (a) not performing shifts which cause wrap around (b) performing the shift but allowing pulses to be lost rather than wrapped around (and informing the decoder) or (c) permitting wraparound but performing a correction to account for the error.

The generation of the codebook remains to be mentioned. This can be generated by Gaussian noise techniques, in the manner already proposed in "Scholastic Coding of Speech Signals at very low Bit Rates". B. S. Atal & M. R. Schroeder, Proc IEEE Int Conf on Communications, 1984, pp 1610–1613. A further advantage can be gained however by generating the codebook by statistical anaylsis of the results produced by a multipulse coder. This can remove the approximation involved in the assumption that the first pulse derived by the "multipusle search' is the largest, since the codebook entries can then be stored with the first obtained pulse in a standard position, and shifted such that this this pulse is brought to the position derived by the unit.

Although the various function elements shown in FIG. 2 are indicated separately, in practice some or all of them might be performed by the same hardware. One of the commercially available digital signal processing (DSP) integrated circuits, suitably programmed, might be employed, for example.

Although the 'multipulse search' option has been described in the context of shifted codebook entries, it can also be applied to other situations where the allowed excitations can be divided into classes within which all the excitations have the largest, or most significant, pulse in a particular position within the frame. The position of the derived pulse is then used to select the appropriate class and only the codebook entries in that class need to be tested.

FIG. 3 shows a decoder for reproducing signals encoded by the apparatus of FIG. 2.

An input 30 supplies a demultiplexer 31 which (a) supplies filter coefficients to a synthesis filter 32; (b) supplies codewords to the address input of a codebook store 33; (c) supplies shift values to a shifter 34 which conveys the output of an exccitation generator 35 connected to the store 33 to the input of the synthesis filter 32. Speech output from the filter 32 is supplied via a digital-to-analogue converter 36 to an output 37.

We claim:

1. A speech coder comprising:

means for generating filter information from frames of input speech signals, said means for generating filter information defining successive representations of a synthesis filter response, and outputting said filter information; and means for generating frames of excitation information for successive frames of said input speech signals, [eahc] *each* of said excitation frames including a series of pulses, said means for generating frames receiving said input speech frames and said filter information and comprising:

(a) a store of data defining a plurality of [representative] excitation frames[, each] having a plurality of pulses and [each representative frame] representing *plural classes* of [member] excitation frames;

(b) means for selecting one of said [member] excitation frames, said selected excitation frame when applied to the input of a filter having said filter information producing a frame of synthetic speech resembling said input speech, and outputting data identifying said selected excitation frame, said means for selecting including:

(i) means for identifying the position within [said input speech] *an excitation* frame of a single pulse which meets a preselected criterion, (ii) selecting one of said stored [representative] *classes of* excitation frames depending on the position of said identified single pulse, and (iii) determining which of said [member] excitation frames within the *selected* class [of said selected representative excitation frame] that *best* matches said input speech frame *when used in conjunction*

*with said filter information.*

2. A speech coder according to claim 1 in which [each] *said data in the store defines one* of said classes *which class* comprises a plurality of member excitation frames each [member] *other class of excitation frames* being a rotationally shifted version of [any other member of the same class] *the stored class.*

3. A speech coder according to claim 2 in which said store contains a list of [one] *all* representative [member of] *members of* [each] *one* of said classes, and further comprising shifting means controllable to generate other [class members] *classes* from said *stored* representative [member] *members.*

4. A speech coder according to claim 3 in which said generating means further comprises shifting means for shifting each of said representative members by an amount corresponding to said identified pulse position.

5. A speech coder according to claim 4 in which said shifting means brings the largest pulse of each of said representative members into the same position within the frame as is said single pulse.

6. A speech coder according to claim 4 in which said stored representative excitation frames are generated by a training sequence comprising identification of the position within the frame of a single, first, pulse meeting said predetermined criterion followed by determination of further pulses, and said amount of shift applied by said shifting means is that shift which brings said first pulse of said representative excitation frame into the same position within the frame as said determined single pulse.

7. A speech coder according to claim 3 in which each of said classes comprises [a member which has] *members which have* been shifted by an amount corresponding to said identified single pulse, and members shifted by amounts which are small variations, relative to the frame size of said amount corresponding to said identified single pulse *position.*

8. A speech coder comprising:

means for generating, from input speech signals, filter information defining successive representations of a synthesis filter response, and outputting said filter information; and means for generating, form said input speech signals and filter information excitation information for successive frames of said speech signals, comprising:

(a) a store of data defining a plurality of representative excitation frames each consisting of a plurality of pulses;

(b) means for selecting one of said representative excitation frames and the amount of rotational shift to be applied to said selected frame which would when applied to the input of a filter having said filter information produce a frame of synthetic speech resembling said input speech signals, and outputting data identifying said selected frame and said amount of rotational shift;

said means for selecting comprising means for:

(i) determining the position within said [framed speech signal] *excitation frame* of a single pulse which meets a preselected criterion, and (ii) selecting the one of said excitation frames which when rotationally shifted by an amount derived from the determined position of said single pulse *is used to generate a speech signal which* most nearly matches said [frame] *input* speech signal.

9. A speech coder including:

filter means for generating synthesis filter response representations from an input speech signal; and excitation means for generating excitation frames from said input speech signal and said synthesis filter response representations, said excitation means comprising:

means for identifying the frame position of a single pulse within said [input speech signal] *excitation frame* which meets a preselected criterion;

a codebook store containing a list of standard excitation frames;

[means for selecting one of said standard excitation frames using the frame position of said identified pulse;]

means for cyclically shifting said standard excitation frames to align said standard frame with said identified pulse; and comparator means for selecting the one of said standard excitation frames which, when aligned and applied to an input filter having said filter response representations, produces synthetic speech most nearly resembling said input speech signal.

10. A method for speech coding using a speech coder having a codebook store containing a list of standard excitation frames [each being] representative of a class of excitation frames, said method comprising the steps of:

(a) framing a digital input speech signal;

(b) forming filter information defining a synthesis filter response indicative of the framed digital input speech signal;

(c) identifying the position of a pulse in [the framed input speech signal] *an excitation frame* which satisfies a preselected criterion;

(d) [selecting a standard excitation frame from the codebook depending on the pulse frame position identified in step (c);

(e)] determining the amount of shift to apply to the [selected] standard excitation [frame] *frames* to match the [framed input speech signal; and] *pulse position identified in step (c);*

*(e) selecting a shifted standard excitation frame from step (d) to match the framed input speech signal when used with said filter information to synthesis a speech signal; and*

(f) outputting data indicative of the selected standard excitation frame and the determined amount of shift.

* * * * *